US009213981B2

(12) United States Patent
Angani et al.

(10) Patent No.: US 9,213,981 B2
(45) Date of Patent: Dec. 15, 2015

(54) TECHNIQUES FOR IMPROVING RELEVANCE OF SOCIAL UPDATES DISTRIBUTED OFFLINE

(75) Inventors: Kishore Angani, Bangalore (IN); Abhinav Singh Teotia, Bangalore (IN); Pankaj Kothari, Bangalore (IN)

(73) Assignee: Yahoo! Inc., Sunnyvale, CA (US)

( * ) Notice: Subject to any disclaimer, the term of this patent is extended or adjusted under 35 U.S.C. 154(b) by 446 days.

(21) Appl. No.: 12/973,862

(22) Filed: Dec. 20, 2010

(65) Prior Publication Data

US 2012/0158843 A1  Jun. 21, 2012

(51) Int. Cl.
*G06F 15/16* (2006.01)
*G06Q 30/02* (2012.01)
*G06Q 50/00* (2012.01)

(52) U.S. Cl.
CPC ............... *G06Q 30/02* (2013.01); *G06Q 50/01* (2013.01)

(58) Field of Classification Search
CPC ... G06Q 30/02; G06Q 50/01; G06Q 30/0271; H04L 67/22; H04L 67/306
USPC ..................... 709/204, 206; 705/14; 719/318; 715/700
See application file for complete search history.

(56) References Cited

U.S. PATENT DOCUMENTS

| | | | | |
|---|---|---|---|---|
| 7,844,604 | B2 * | 11/2010 | Baio et al. ..................... 707/732 |
| 8,126,759 | B2 * | 2/2012 | Robertson et al. ........... 705/7.19 |
| 8,171,128 | B2 * | 5/2012 | Zuckerberg et al. .......... 709/224 |
| 2008/0126476 | A1 * | 5/2008 | Nicholas et al. .............. 709/203 |
| 2008/0155080 | A1 * | 6/2008 | Marlow et al. ................ 709/223 |
| 2008/0209320 | A1 * | 8/2008 | Mawhinney et al. ......... 715/700 |
| 2009/0137229 | A1 * | 5/2009 | Ye et al. ..................... 455/412.1 |
| 2009/0144075 | A1 * | 6/2009 | Flinn et al. ........................ 705/1 |
| 2010/0169789 | A1 * | 7/2010 | Cheng et al. .................. 715/738 |
| 2010/0250477 | A1 * | 9/2010 | Yadav ............................. 706/14 |
| 2010/0257113 | A1 * | 10/2010 | Dorrell ......................... 705/319 |
| 2011/0153421 | A1 * | 6/2011 | Novikov et al. ........... 705/14.52 |
| 2011/0161987 | A1 * | 6/2011 | Huang et al. .................. 719/318 |
| 2011/0208585 | A1 * | 8/2011 | Daboll et al. .............. 705/14.53 |
| 2012/0203838 | A1 * | 8/2012 | Zuckerberg et al. .......... 709/204 |

FOREIGN PATENT DOCUMENTS

WO    WO2010020820    *  2/2010

* cited by examiner

*Primary Examiner* — Joon H Hwang
*Assistant Examiner* — Abdulkader M Alriyashi
(74) *Attorney, Agent, or Firm* — Martine Penilla Group, LLP (57) ABSTRACT

Methods and system for delivering updates to recipients in a social network includes receiving event related data in response to triggering of an event at a client. In response to the triggering of the event at the client, recipient data related to a recipient that is authorized to receive the event related data is retrieved. An agent is provided for the recipient. The agent includes logic for formatting and delivering the event related data to the recipient. The recipient's interaction in response to delivery of the event related data is tracked. The logic within the agent is refined based on the interaction of the recipient. The agent with the refined logic is used for subsequent formatting and delivering of event related data to the recipient.

18 Claims, 3 Drawing Sheets

TECHNIQUES FOR IMPROVING RELEVANCE OF SOCIAL UPDATES DISTRIBUTED OFFLINE

BACKGROUND

1. Field of the Invention

The present invention relates to social networking, and more particularly, to generating personalized social updates that are more relevant to a user based on explicit and implied user interests.

2. Description of the Related Art

Social networking has grown tremendously in recent years. With the meteoric rise in popularity of various social networking sites, there is an increased competition amongst these social networking sites to attract, engage and retain users. Some of the ways these social networks have been trying to lure users include providing various degrees of freedom to customize users' homepage or profile information, providing notifications in a timely fashion, etc. The notifications are provided as offline updates to the users on various events that the user prefers. The user provides explicit instructions on which events he needs notification and the mode of notification, and the sites provide updates to these events in a timely fashion complying to these requirements. Often these offline updates are provided as email notifications and follow certain pre-defined patterns. For instance, the notifications are provided as periodic digests, if the user requested for one, wherein the updates are arranged in a chronological order of particular events or selected contact list. When a user has an expansive friend circle, this form of notification can become overwhelming as the user has to sift through the entire digest in order to be informed of various events and status associated with all the friends.

The existing offline updates have certain drawbacks. One drawback is that the notifications do not take the user's interest into consideration when providing updates. As a result, the notifications may deliver activities/events of low relevance to a user at the same level of importance as high relevance activities/events making such updates less interesting and less appealing to users. This might lead to opting out of such updates and low to non-existent interest in the social network site itself, defeating the very purpose of the updates. Another drawback of notifications is that the notifications do not consider content relevance when providing the updates.

All of these drawbacks result in lowering users interest and subsequent dropping out from such social network sites. It is therefore essential to retain and improve user engagement in the social network in order to enhance user traffic to the site subsequently improving monetization.

It is in this context that the embodiments of the invention arise.

SUMMARY

Embodiments of the present invention describe methods and systems that employ a dynamically programmable algorithm for delivering offline updates to recipients in a social network in a manner that includes information that is most relevant to the recipient. The algorithm is embodied in an agent, which is associated with a recipient of the update. The agent includes logic to format and deliver event related data to the recipient and track interaction of the recipient in response to the delivery of the event related data. The logic within the agent is dynamically refined during run-time based on the interactions of the recipient. The refined logic of the agent is used for subsequent delivery of event related data to the recipient. The algorithm, thus, aids in providing customized and relevant data related to the recipient that effectively captures the recipient's interest thereby enticing the recipient to the social network.

It should be appreciated that the present invention can be implemented in numerous ways, such as, methods, systems and an apparatus. Several inventive embodiments of the present invention are described below.

In one embodiment, a method for delivering updates to recipients in a social network is disclosed. The method includes receiving event related data in response to triggering of an event at a client. Client, as used in this application, refers to a computing device owned and operated by a user. Recipient data related to a recipient that is authorized to receive the event related data is retrieved, in response to the triggering of the event at the client. An agent is provided for the recipient. The agent includes logic for formatting and delivering the event related data to the recipient. The recipient's interaction in response to delivery of the event related data is tracked. The logic within the agent is refined based on the interaction of the recipient. The agent with the refined logic is used for subsequent formatting and delivering of event related data to the recipient. The refined logic provides the most relevant and customized data that captures the interest of the recipient.

In another embodiment, a method for delivering updates to recipient in a social network is disclosed. The method includes receiving event related data in response to triggering of an event at a client. The event related data is stored in a feed cache for subsequent retrieval. Data associated with a plurality of recipients authorized to receive the event related data is retrieved. An agent for the plurality of recipients is identified. The agent includes logic to format and deliver the event related data to the plurality of recipients. Interaction of a recipient from the plurality of recipients in response to the delivery of the event related data is tracked. The recipient is a highly engaged recipient. A second agent is spawned from the agent in response to the tracked interactions of the highly engaged recipient wherein the second agent includes logic that is refined and distinct from the logic in the agent. The second agent is assigned to the highly engaged recipient and provides formatting and delivery logic targeted for the highly engaged recipient. The second agent and the agent are used for delivering subsequent event related data to the corresponding recipients.

In yet another embodiment of the invention, a system for delivering updates to recipients in a social network is disclosed. The system includes a client for triggering an event. The triggering of the event generates event related data. The system also includes a server configured to receive the event related data from the client in response to the triggered event. The server includes an agent having logic that is configured to receive the event related data from the client, receive data associated with a recipient that is authorized to receive the event related data, determine a preferred delivery channel for delivering event related data, dynamically formatting the event related data to comply with requirements of the preferred delivery channel, track interaction of the recipient in response to delivery of the event related data, and refine the logic contained within the agent based on the interaction of the recipient so as to use the refined logic for delivering subsequent event related data to the recipient that is relevant to the recipient.

Thus, the embodiments of the invention provide an effective and efficient tool that uses a recipient's behavior in response to the delivery of the event related data to rank, prioritize and format subsequent event related data targeted for delivery to the recipient. The algorithm constantly refines and evolves to reflect any changes in the recipient's behavior so that the delivered event related data truly reflects the recipient's interest. By focusing on the user's implicit and explicit behavior at the event related data associated with various events, one can gauge what events the user is most interested in, filter out the data on events that the recipient has shown little or no interest in and deliver the most relevant event related data associated with various events to the recipient in an order of priority. Such focused delivery of the most relevant event related data is sure to pique a recipient's interest thereby enticing the recipient to the social network, thereby increasing the monetization at the social network.

Other aspects of the invention will become apparent from the following detailed description, taken in conjunction with the accompanying drawings, illustrating by way of example the principles of the invention.

BRIEF DESCRIPTION OF THE DRAWINGS

The invention may best be understood by reference to the following description taken in conjunction with the accompanying drawings.

DETAILED DESCRIPTION

Broadly speaking, the embodiments of the present invention provide methods and systems for delivering update notifications (updates) to recipients in a social network. The updates provide a list of event related data that is most relevant to the recipient. The most relevant data is identified by monitoring the recipient's behavior in response to an update provided to the recipient and continuously filtering and formatting subsequent event related data so that data that is most relevant is presented to the recipient in a manner that enhances the quality of updates to recipients. The monitoring of a recipient's behavior takes into consideration not only the user's behavior towards the content but also the frequency of the updates that is being delivered to the recipient as well as delivery device selection so that subsequent formatting and frequency of delivery of updates can be adjusted accordingly. The algorithm thus addresses some of the drawbacks of conventional data update software. Conventional event related data updates followed a generic update pattern that was common to each and every recipient and did not take into consideration the recipient's individual interest for frequency, content, preferences of such updates, as well as recipient's preferred device for receiving such updates. As a result, the updates were formatted in a generic format, such as the event related data being presented in a chronological order with each type of event related data from various sources being given equal importance or being presented in an order of contacts generating the event related data, making such updates less user-friendly.

The current embodiments, on the other hand, teach an agent model wherein an agent is provided for each recipient. The agent includes logic that is configured to analyze each recipient's interest in such updates by monitoring the particular recipient's behavior in response to the delivered updates and customizing subsequent updates to the corresponding recipient that reflects the recipient's current interest. The subsequent updates delivered by the agents to the recipient is of high quality and is recipient-centric that specifically caters to the respective recipient's interest and informational requirements making these updates more relevant and useful to the recipient thereby enhancing the interest of the recipient to such updates.

Figure 1:
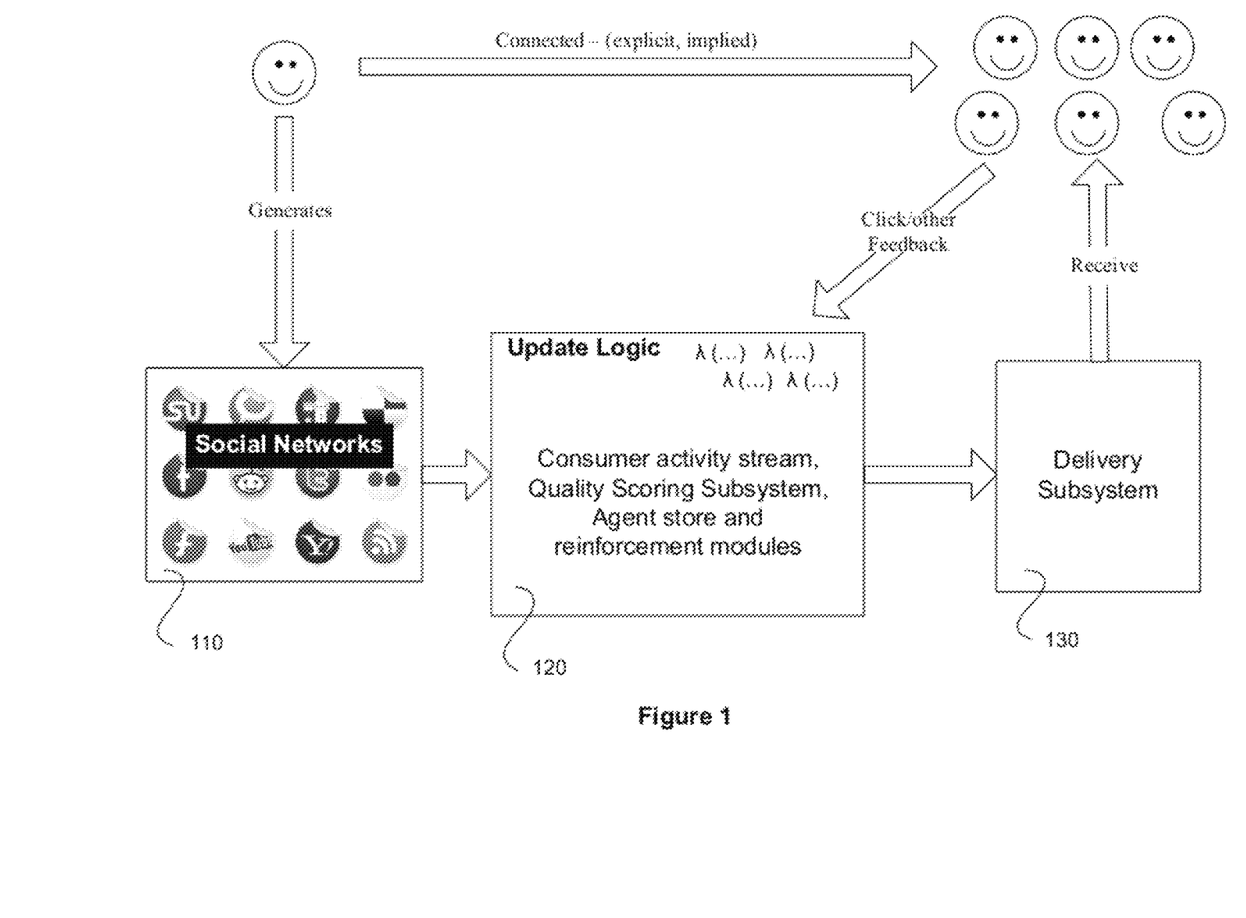
FIG. 1 illustrates a simplified overview of a system equipped with an agent for delivering updates to recipients in a social network, in one embodiment of the invention.

With the brief overview, various embodiments of the invention will now be described in detail with reference to the figures. FIG. 1 illustrates a simplified overview of the system identifying various participants/high-level modules that are involved in providing quality updates to recipients, in one embodiment of the invention. A user triggers an event on one of the social network, such as Yahoo!™ Meme, Twitter, Facebook™, Flickr™, Del.icio.us™, etc. The user is an event-generating user. The event, for instance, could be a web log (blog) or a photo upload or status update or a tweet. The user is connected to a network of users (recipients) through the social network 110 either through explicit connection or implied connection. The explicit connection could include primary contacts established through the social network, such as friends, relatives, family, golf buddies, etc. Implied connection could include secondary contacts that may be established either through the primary contacts of the social network 110, such as friends of friends on the social network site Facebook, or other contacts in the email, etc. Any update event triggered by the user generates event related data that is formatted within an Update Logic 120 and transmitted through a delivery subsystem 130 reaching out to a plurality of recipients in a manner that would prompt them to read/view it. In response to the event related data presented to the recipients, each recipient's behavior, such as click activity or opening of a mail, is captured and fed back into the system so that the next event related update (email/notification) is based on the respective recipient's behavior at the previous event related update. For instance, in response to the transmission of event related data, if a particular recipient selects a specific event-generating user's event or the location first from the transmitted update then the specific event-generating user's event or location is ranked higher for that recipient. Based on such captured feedback, subsequent updates are appropriately formatted and delivered to the recipient's device in the form of, for example, SMS feeds. The SMS feed is one form for providing updates to events/location for the recipient and is to be considered exemplary and not restrictive. Thus, a recipient's behavior is indicative of the importance of specific event related data or location/other information associated with event-generating user, to the recipient. The formatting of subsequent updates to the recipient is by ranking and prioritizing the event related data/information about the event-generating user in order of importance to the recipient. The ranking and prioritizing of event related data to a particular recipient can be better described by the following example.

For instance, an event-generating user may generate two events—a photo upload event and a weblog event. In response to the generated events, event related data describing the two events may be sent to all the recipients that are authorized to receive the event related data from the event-generating user. For some recipient receiving both event related data, a particular event, such as a blog, may be important and for some other recipient, a photo upload may rank higher in relevance to other event related data. As a result, the first recipient may click on the weblog (blog) first while the second recipient may click on the uploaded photo first. Thus, monitoring each recipient's behavior through click activity or other such explicit/implied behavior in response to the event related updates delivered to the respective recipients, more relevant updates can be delivered to each of the recipient. As the behavior of each of the recipient keeps changing over time, such behavioral changes are mined and reflected in the subsequent update feeds delivered to the respective recipients. The Quality Scoring Subsystem provides the necessary logic to capture these varying interactions by the respective recipients and uses the captured interaction to identify, rank and format subsequent updates to each of the recipients that would reflect their respective preferences. As a result, there may be a point where the two recipients will eventually end up with updates that are formatted in a totally different way from one another. This is due to the fact that the two recipients' behavior has evolved over time and the updates reflect the changing interests and preferences. Further, the user's behavior is also used in determining the user's preferred delivery channel and the updates are formatted and delivered accordingly. For instance, the updates could be in the form of a link that is sent to an inbox, such as email, IM, etc., of the recipient. Thus, the embodiments of the invention provide the necessary logic to intelligently determine what type of content a user prefers through behavioral tracking rather than relying on a plurality of forms that is explicitly provided by the recipient and refine the updates by dynamically prioritizing and rearranging the data to be delivered to the recipient's preferred inbox based on the tracked behavior.

Figure 2:
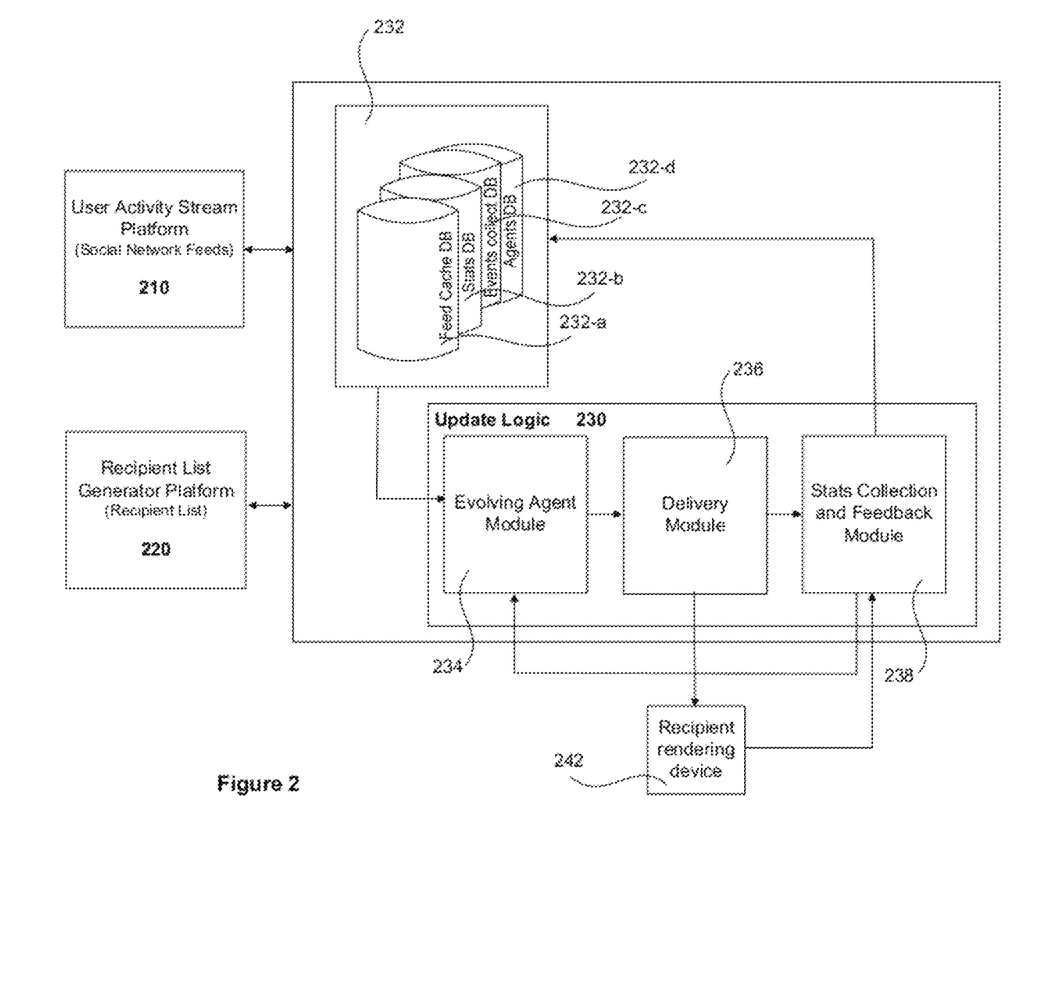
FIG. 2 illustrates an simplified block diagram of the various modules within a system that is equipped with an agent algorithm for delivering updates to recipients in a social network, in one embodiment of the invention.

FIG. 2 illustrates a simplified block diagram of various modules that are used in delivering relevant updates to each recipient. A server receives event related data when an event is triggered at a client. The event related data provides information about the event. The server may receive the event related data from a plurality of sources, such as Twitter, Facebook™, Yahoo!™ Meme, Flickr™, Del.icio.us™, etc. In one embodiment, the event related data from a plurality of sources are received in a database, such as a "User Activity Stream" database 210, and provided as a feed to an "Update Logic" 230 at the server. The User Activity Stream database (User Activity Platform) 210 acts as a pipeline mechanism that receives and processes all event related data received from various sources and provides a streamline of data feeds continuously to the update logic 230. In one embodiment, the User Activity Stream database 210 is capable of receiving event related data from over 190 different social network sources. It should be noted that the number of social network sources is exemplary and should not be considered restrictive. The update logic 230 interacts with a plurality of databases 232 to retrieve and store data associated with the event generated by the event-generating user. Upon receipt of the event related data at the update logic 230, a unique feed identifier, such as feed ID, is generated and associated with the event related data and saved in a feed database, such as a feed cache database 232-a, for subsequent retrieval. The event related data in the feed cache database 232-a are stored in a sequential order as and when the event related data is received. The event related data provides the content for the social updates to the recipients.

In response to the triggering of the event, update logic 230 within the server queries a database, such as a Recipient List, to identify at least a recipient who is authorized to receive the social update of the event generated at the client. The recipient is identified by a universal identifier, such as a globally unique identifier (GUID). In one embodiment, a "Recipient List Generator Platform" (also termed as Recipient List) 220 provides the details of which recipient is authorized to receive the event related data generated by a particular event-generating user (also termed "user"). In one embodiment, the Recipient List 220 intelligently decides which recipient(s) the event-generating user is connected to and the delivery strength and identifies the recipient(s) based on this decision. For instance, user 1 and user 2 may have 10 common friends and user 1 and user 3 may have 5 common friends. When user 1 generates an event, the Recipient list 220 will intelligently select user 2 and user 3 and rank user 2 higher than user 3 when identifying the recipients for the event related data for the event generated by user 1. This is one sample criterion used by the Recipient list 220 in identifying the recipients for receiving the event related data generated by an event-generating user. Additional criteria may be used in selecting and ranking the recipients for providing the event related data updates. The affected GUID(s) is/are mapped to the Feed ID and the GUID information is pushed to update logic 230 for further processing.

The Evolving Agent 234 module in the update logic 230 assigns an agent for each GUID. In one embodiment, a distinct agent is provided for each GUID. In another embodiment, a generic agent is provided to a group of GUIDs that includes the affected GUID and additional agents are spawned from the agent based on the behavior of each of the recipients in the group. For instance, an agent may be assigned to a group of GUIDs. The agent, in this instance, includes generic logic that covers generic user request for specific user groups, such as male in US requesting football update, females in US requesting a particular concert update, males in India requesting cricket update, females in India requesting particular movie review update, etc. As a result, when a GUID of a recipient is received at the update logic, the recipient's profile is used to bucket the recipient into the appropriate agent category. When an event related data is received at the update logic, the GUID associated with the event related data invokes the appropriate agent for the recipient. The generic agent associated with the recipient will use the logic contained therein to weight the various events targeted for the recipient, rank and order the events and deliver the events to the recipient through the delivery system. When the particular recipient's behavior gravitates away from the behavior of the rest of the recipients in the group, a new agent may be spawned from the assigned agent. In this instance, the different behavior of the particular recipient entails changing of the logic contained within the agent justifying the spawning of the new agent. The new agent is then assigned to the particular recipient so that the updates delivered to this particular recipient reflect the recipient's delivery requirements.

Upon invoking, the agent assigned to the recipient identifies and retrieves the event related data for the recipient and processes the data for onward transmission to the recipient. Accordingly, the agent interacts with the feed cache database 232-a to retrieve the event related data using the GUID and the feed ID mapped to the GUID. Once the event related data is retrieved, the agent determines the relevancy of the event related data based on the recipient's profile. For instance, recipient A from the event-generating user's friend list may show a greater interest in photo uploads than blogs. In this case, the agent for recipient A will provide a higher weightage to a photo upload event and a comparatively lower weightage to a blog event based on this recipient's profile. The recipient's profile defines his interest as reflected by his online activity/interest. As a result, the recipient's agent uses the logic within to weigh the various events by computing a score for each of the event related data that is targeted for the recipient based on the rules contained within the logic. The agent then checks to see if a threshold value is reached. The threshold value for each of the recipient can be different.

The agent for each of the recipient constantly mines the recipient's online activity and dynamically adjusts the recipient's profile that includes delivery requirements according to the mined data. It should be noted herein that as various users' behaviors are different, the agent assigned for each of the recipient will provide the necessary algorithm based on the respective recipient's evolving behavior so as to enable the agent to weigh and prioritize the various events generated by the event-generating users and provide the necessary updates that is most relevant to the respective recipient. The agent contains logic that takes into account the mined data associated with the recipient, analyzes the mined data and dynamically reprograms (mutates) the logic, wherein the mined data reflects the recipient's online behavior. The reprogrammed and refined logic is used during subsequent delivery of updates. If two agents are processing event related data for two recipients, then the logic within each of the agent will weigh the same events differently and generate two different scores for the events for the recipients based on the respective recipient's mined behavior. Based on the scores the recipients receive the events in two different ways that are distinct from each other. The event related updates are offline updates that are processed by the agent and delivered to the recipients periodically.

Still referring to the agent module, the agent takes into consideration the preferences of the recipient based on the recipient's profile and computes a quality score (QS) for the event. The agent then ranks and orders the event related data for the recipient by comparing the relevancy of the event related data with other event related data targeted for the recipient based on the respective quality scores. In one embodiment, the agent determines that the event related data does not meet the quality requirements for delivery to the recipient. In such a case, the event related data is discarded and is not considered for delivering to the recipient. For instance, when the agent is aggregating the offline updates to a particular user, it may come across a tweet that is over 3 days old. The algorithm of the agent associated with the particular user will identify the stale data that does not meet the quality requirements and automatically discard the stale data. In the above instance, the agent will discard the tweet as stale data.

In addition to verifying the quality of the event related data, the agent verifies whether a delivery threshold value for the specific recipient is met so as to trigger delivery of the event related data to the recipient. Towards this end, the agent, in response to receiving the event related data due to the triggering of the event, interacts with a database, such as Stats database 232-b, to query and retrieve information, such as a delivery threshold value and a cumulative delivery score, for the specific recipient. The cumulative delivery score is a dynamic value that is maintained for each recipient and is indicative of the number of event related data that is waiting to be delivered for the recipient. The delivery threshold value is a static value that provides the delivery condition specified by the recipient for delivering the offline updates. Upon retrieving the cumulative delivery score, the agent increments the cumulative delivery score of the recipient to account for the event related data that was triggered by the event and compares the cumulative delivery score against the delivery threshold value for the recipient to determine if the delivery condition, such as reaching the delivery threshold value, has been met. If the delivery condition has been met, the agent retrieves and transmits the event related data of all events that are targeted for delivery to the recipient, a preferred delivery channel specific to the recipient for delivering the update, selects a template to deliver the update and forwards the recipient, template, delivery channel and event related information to a delivery module 236. In one embodiment, the agent retrieves the information that are used for delivering the update from a "Events Collection database" 232-c. The events collection database 232-c is a repository that stores event related data along with the Feed ID and recipient's ID for each recipient in the recipient ID order.

The delivery module 236 formats the event related data based on the relevancy using the template and forwards the formatted event related data to the recipient at the recipient's preferred rendering device 242 as an alert notification. The formatting of the event related data, in one embodiment, includes rearranging the event related data in relation to other event related data within the update based on the relevancy to the recipient. In one embodiment, the formatting of the event related data includes grouping relevant events together, compressing information accumulated to a user friendly gist, ordering the class events so that the freshest updates are ranked higher. In another embodiment, the formatting of the event related data includes enriching the content of the event related data with customization data. The customization data may be specific to a recipient or to a group of recipient, etc., and may provide additional information about the event related data, such as information about the creator, source, the recipient, or the content. For instance, the customization data may include originator profile image, source property icon, friendly name, avatar, etc. As can be seen, the customization of data provides additional information that enables the recipient to quickly identify an event thereby enriching the recipient's online experience.

If the delivery parameters are not met, then the quality score for the event related data and the corresponding Feed ID are stored in the Events collection Database 232-c, for later retrieval. Additionally, the cumulative delivery score is stored in the Stats database 232-b, along with the recipient information. The Stats database is a repository that stores user click behavior and delivery statistics. The agent assigned for the recipient then waits for the next event targeted for the recipient to determine if the update needs to be delivered to the recipient.

In response to the delivery of the event related data, the agent activates user link tracking (ULT) for the recipient. The ULT captures any and all online interactions, such as clicks, email openings, etc., of the recipient in response to the delivery of the event related data. The recipient interactions are collected by a Stats Collection and Feedback module 238 and stored in the Stats database 232-b. The interactions of the recipient from the stats module is used in refining the logic within the agent assigned for the recipient by a "Train Agent" module. The "training" of the agent includes fine-tuning the logic within the specific agent so as to change the computation of the weight of the events based on the specific user behavior. The changed logic of the specific agent is stored in an agent database 232-d and used for subsequent mining and delivery of the event related data to the recipient.

The agent selects a delivery channel for transmitting the update feed to the recipient based on the recipient's profile and behavior, which includes the device used in accessing the updates. The delivery channel provides the necessary info to the agent to indicate what type of formatting needs to be done to the feed. For instance, the delivery channel may specify that the particular update is to be delivered as a Hypertext Markup Language (HTML) feed or a Short Message Service (SMS) feed, which is typically used by mobile devices. Depending on the delivery channel, the agent determines the template that needs to be activated. The template provides the necessary formatting details for rendering the update feed at the recipient's preferred device. For instance, the formatting may include information on how to present the event related data visually including how to present the photos, etc., how to present tweet information, such as number of tweets, details of tweets, summary of tweets, etc., that the agent perceives the recipient wants, so that the delivery of the feed can be effectuated. The template provide the information on how to send the update feed, how rich the feed should be and what information to include, such as each feed being rendered as thumbnails or regular format, etc.

The delivery threshold value can be either a number or condition or a combination of both number and condition. For instance, the delivery threshold value could indicate that if the number of events exceeds 100 then the feed has to be pushed to the recipient. In another instance, the delivery threshold condition may indicate that if the day of the week is a Wednesday then push the event related data for blog events to the recipient. In another instance, the delivery threshold value could indicate that if the event related data exceeds 50 and if the time of day is 5:00 p.m. then push the event related data to the recipient. As can be seen, various combinations of delivery threshold values and conditions can be used by the agent in delivering the event related data.

The delivery of the event related data to the recipient, mining of the recipient's interaction in response to the delivery of the event related data, refining of the logic in the agent assigned to the recipient and using the refined logic of the agent for subsequent delivery of the event related data continue as long as there is event related data available for delivery and as long as the recipient requests such update feed.

The update feed provides a rich and high quality event related data that is specifically customized to the recipient's requirements. The customized event feed plays an important role in enticing the recipients back to the network thereby enhancing user engagement at the network. Other advantages will become apparent to one skilled in the art upon reading the various embodiments of the invention.

Figure 3:
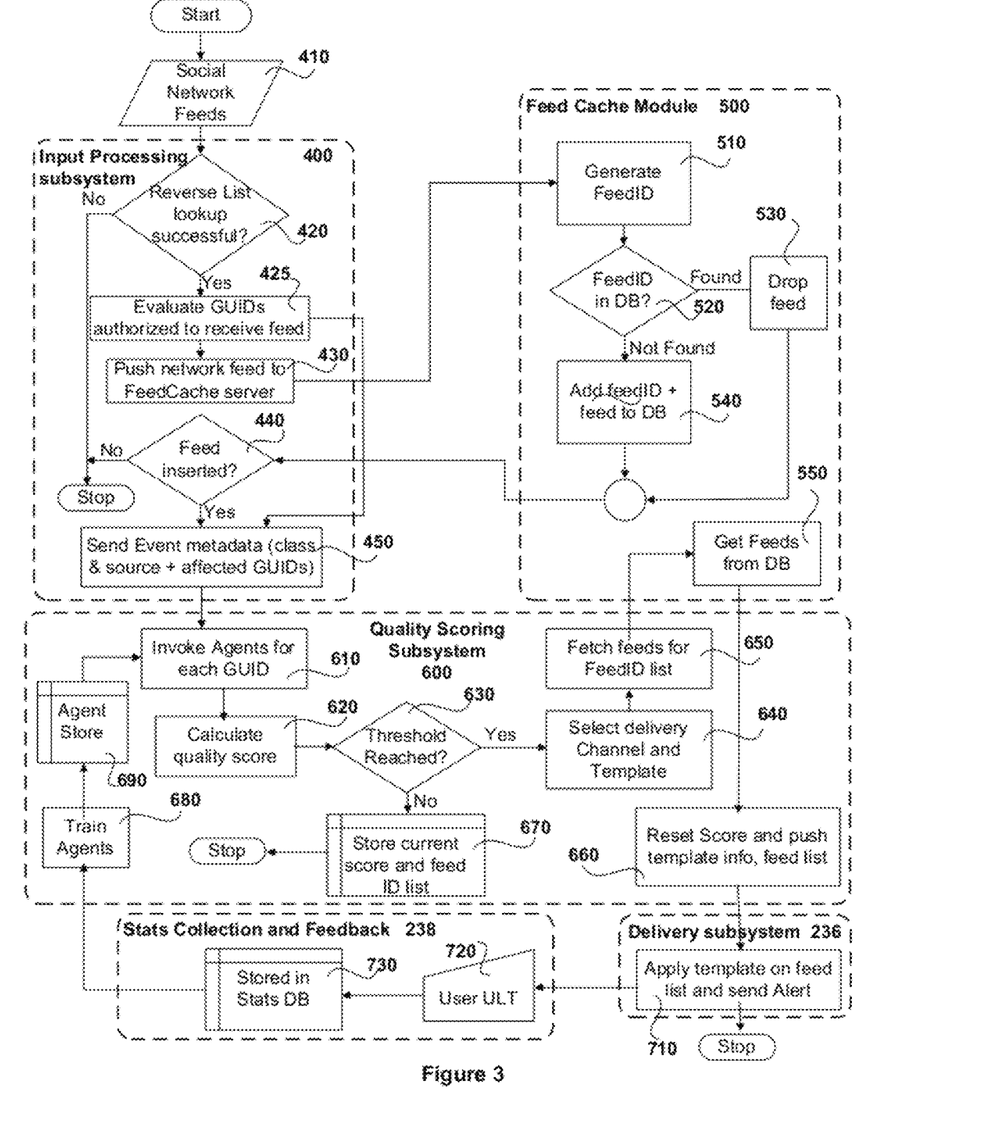
FIG. 3 illustrates a sample process flow of data through various modules of the system used for delivering updates to recipients in a social network, in one embodiment of the invention.

FIG. 3 illustrates a detailed flow chart of various operations carried out by different modules of the system, in one embodiment of the invention. Broadly speaking, the system includes three main modules—an input processing subsystem (IPS) 400, a feed cache module (FCM) 500 and a quality scoring subsystem (QSS) 500. The IPS 400 performs the mining of the event related data as and when the events are triggered, and identifies a list of recipients that are authorized to receive the event related data. The FCM 500 receives the event related data pushed by the IPS 400 and stores the event related data in a feed cache database for subsequent retrieval. In essence, the IPS 400 and FCM 500 modules define what information needs to be sent in an update and which recipients are targeted to receive the update information. These two generic modules are used by most of the conventional offline update notification system. The QSS 600 defines how the update information is to be formatted, when and where to deliver the updates to the recipients. The updates sent to the recipients from each of the social networks are offline updates that the system gathers for a reporting period and are usually presented to the recipients in an email. It is to be noted herein that email is only one form of notification. The embodiments are not restricted to email form of notification but that other forms of notification can also be engaged so long as the notifications are able to include the formatted updates and performed in a timely manner. With the general understanding of the role of each module within the system, the process in each of the modules will now be described in detail with reference to FIG. 3.

The IPS 400 is configured to receive event related data in response to triggering of an event at a client. The event related data may be received at the server from various sources that are both internal or external to the system, as illustrated in operation 410. The event related data defines event characteristics and metadata, such as creator of the event, event creation time, source of the event (such as Flickr, Facebook, avatars and/or other user profiles), class of the event (such as photo, blog, tweet, etc), and type of the event (such as status update, photo upload, avatar changes, etc). The above list of event characteristics is exemplary and should not be considered restrictive. Additional or fewer characteristics may be included in the event related data to distinctly define the event.

Upon receipt of the event related data, the process evaluates recipient information by first querying a recipient database to determine which recipient is authorized to receive the event related data of the specific event. In one embodiment, the recipient information is obtained by querying the recipient database, such as a "Recipient List", and to determine if a recipient is authorized to receive the event related data, as illustrated by decision box 420. If there are no recipients found for the event related data, then the event related data is discarded and the process ends, as illustrated by the "No" branch of decision box 420. The Recipient list provides a collection of "stake-holders" or recipients for the events generated by a particular event-generating user. The recipient information obtained from the Recipient list includes details of primary contacts, secondary contacts and tertiary or other general contacts. The recipient may have provided explicit instructions to receive the specific event related data generated by an event-generating user or the event-generating user may have provided explicit instructions for sharing the event generated by the event-generating user with a select group of people.

Querying the recipient database, such as a Recipient list, using a recipient's profile and/or event-generating user's profile, it is possible to determine whether any recipient is authorized to receive the event related data for a specific event generated by an event-generating user and, if so, which recipients are authorized to receive the event related data for the specific event. Accordingly, in one embodiment, the select group of people identified by the query may include primary contacts of the event-generating user. In another embodiment, the select group of people may be both primary contacts and secondary contacts of the event-generating user. In one embodiment, the select group of people may be all the recipients (i.e. general public) in the recipient database. In any case, the Recipient list provides information associated with the recipient that is authorized to receive the event related data. If the Recipient list query is successful, as illustrated by the "Yes" branch at decision box 420, then the identified recipient's information is evaluated, extracted and pushed to the quality scoring subsystem (QSS), as illustrated in operation 425. The evaluation includes determining how many recipients are authorized to receive the event related data and extracting the recipient related data from the Recipient list. It should be noted herein that the Recipient list query at decision box 420 does not only yield a binary value, as indicated by the two branches ("Yes" branch and a "No" branch), but is also indicative of the number of recipients that are targeted to receive the updates. The recipients are identified by their respective global universal identifiers (GUIDs).

Still referring to the IPS module 400 of FIG. 3, the event related data is carefully inspected to ensure that only the latest and most up-to-date event related data is forwarded to the QSS. In order to ensure that only the freshest data is delivered to the recipient, the event creation date, in one embodiment, is extracted from the event related data, and checked for expiration against a predefined set of lifetime constant values or conditions established at the server, based upon the particular event's characteristics. If the event creation date falls within the predefined set of lifetime constant values, the event related data will be pushed to the FCM for storage and subsequent retrieval. If the event creation date falls beyond the predefined set of lifetime constant values/conditions, then the event related data is considered stale and may not be pushed to the FCM for storing in the feed cache database, in one embodiment. Instead, the stale event related data may be discarded and not updated to the feed cache database.

Referring now to the feed cache module (FCM) 500 of FIG. 3, in response to the event related data pushed by the IPS module, a unique feed identifier (ID) is generated for the specific event related data, as illustrated in operation 510 in the FCM 500. Upon generating the feed ID for the specific event related data, the feed ID is verified against other feed IDs in the feed cache database by parsing the IDs available within the feed cache database to ensure that the newly generated feed ID is distinct and not a duplicate, as illustrated in decision box 520. If a match to the feed ID is found in the feed cache database, as illustrated by the "Found" branch at decision box 520, then the generated feed ID for the event related data pushed by the IPS is considered a duplicate and is dropped or discarded, as illustrated in operation 530. This may happen when the same event related data is pushed by the IPS to the FCB twice. The verification step thus avoids processing duplicate event related data feeds. If, on the other hand, there was no match for the feed identifier found in the feed cache database, as illustrated by the "Not Found" branch at decision box 520, then the feed ID is considered unique and is added to the feed cache database along with the event related data for subsequent retrieval, as illustrated in operation 540. Upon successful addition or rejection of the event related data in the feed cache database within the FCM, the process returns to IPS wherein the insertion or rejection of the event related data is verified. It should be noted that the feed cache database is one exemplary form where the event related information is stored for later retrieval. Other ways of storing the event related data may be engaged so long as the event related data may be efficiently stored for quick retrieval.

Referring now to the IPS module of FIG. 3, the process performs another verification to ensure that the event related data was successfully inserted into the feed cache database, as illustrated in decision point 440. During the verification at the IPS, if the process finds that the event related data was successfully inserted, then the process proceeds to send the event related data including metadata, such as feed ID associated with the event related data, content characteristics, such as class, event, source, etc., and the recipients related data to the QSS for further processing, as illustrated in operation 450. The information that is pushed to the QSS includes number of recipients receiving the event related data, recipient GUIDs of each of the eligible recipients, feed ID of the event related data mapped to the GUID of the recipient and the metadata that describes the recipient and the event related data. In the case where the event related data was considered a duplicate and not inserted in the feed cache database, as shown by the "No" branch at decision box 440, the event related data and the recipient related data is not pushed to the QSS and the process stops and waits for the next event related data to trigger the process.

The QSS module 600 describes how the event related data is formatted and delivered to the appropriate recipient. In order to provide the most relevant and recipient-centric offline updates to the recipient, the QSS is equipped with an agent for each recipient, in one embodiment of the invention. The agent may be specific to a recipient or may be specific to a demographically segregated group of recipients. The agent includes logic that applies various metrics to score the event, adds the score to the delivery quality metric for the recipient, compares the delivery quality metric against a threshold, such as a critical-to-deliver threshold, and accumulates, formats and delivers the event related data in a manner that is most desirable and suited for the recipient. As mentioned earlier, the critical-to-deliver threshold may be a number or condition or a combination of both number and condition.

Still referring to the QSS module in FIG. 3, upon receipt of the event metadata and recipient data from the IPS, an agent assigned for the recipient is identified using the GUID of the recipient, and invoked, as illustrated in operation 610. The agent uses the logic contained therein to compute quality score for the event related data received at the QSS, as illustrated in operation 620. The quality score is based on the recipient's behavior in response to event related data presented earlier and defines the importance/relevance of the event related data to the recipient. The quality score is computed by applying various quality metrics, such as click-through-rate of the user with respect to an event type, profile interests match, demographics/geo matches, for the event as related to the recipient, to name a few. The various quality metrics mentioned above are exemplary and should not be considered restrictive. The quality score is then accumulated into a delivery metric, such as a delivery quality metric, for the recipient. The delivery quality metric defines the delivery requirements specified by the recipient based on the recipient's behavior.

The agent then verifies to see if a threshold value is reached, as illustrated in decision box 630, by comparing the delivery metric against a predefined delivery quality metric defined for the recipient. It should be noted that the various metrics, such as delivery quality metric, etc., are pre-defined for the recipient and could vary from one recipient to another. For instance, the delivery quality metric may specify threshold values and/or conditions that have to be met for the recipient in order for the event related data to be forwarded to the recipient. In one embodiment, the delivery quality metric may define the frequency period for delivering the event related data in an offline update. In another embodiment, the delivery quality metric may be a value that defines a maximum number of events that can be included in the update. These delivery quality metrics are defined and stored in a "Stats" database. The Stats database may be internal to the server or external to the server. The agent, in one embodiment, will seek these delivery quality metric conditions/values for the recipient by querying the Stats database. If the delivery quality metrics are not met, as illustrated by the "No" branch at decision box 630, then the computed quality score for the event related data that triggered this process along with the feed ID of the event related data is stored in the Stats database under the specific GUID for subsequent mining, as illustrated in operation 670. The process ends after storing the event related data and waits for next trigger event to occur.

Still referring to the QSS in FIG. 3, if the delivery quality metrics for the recipient are met, as indicated by the "YES" branch at decision box 630, the agent will select a delivery channel to use for delivering the formatted event related data to the recipient and a template that relates to the selected delivery channel for formatting the event related data, as illustrated in operation 640. A set of delivery channels and templates used for delivering the event related data are pre-defined and stored in a tools database and made available to the agent during the delivery process. The templates may be specific to specific delivery channels.

After selecting the delivery channel and the template for reporting the event related data to the recipient, the agent performs a fetch operation to retrieve the content of the event related data that is stored in the feed cache database so that the content can be bundled and forwarded to the recipient, as illustrated in operation 640. The fetch operation from the agent, in turn, translates to a "get-feed" operation at the FCM for fetching the event related data from the feed cache database, as illustrated in operation 650. The "get-feed" operation includes the feed identifier (feed ID), the recipient identifier in the form of GUID, and other metadata that clearly identify the event related data that needs to be extracted from the feed cache database for onward reporting to the recipient.

The "get-feed" operation extracts the relevant event related data based on the feed ID and pushes the extracted event related data to the QSS for further processing. The event related data retrieved from the FCM along with template information and delivery channel information is pushed to a delivery subsystem 236 for formatting and delivery, as illustrated in operation 660. Upon pushing the event related data to the delivery subsystem 236, the agent resets the delivery metrics and quality score for the recipient so that subsequent updates to the recipient can be effectuated.

The delivery subsystem 236 receives the information pushed by the QSS and applies the template to the event related data and sends the formatted information related to the event to the recipient at a recipient's preferred device, as illustrated in operation 710. The formatting of the event related data covers both presentation and frequency. In response to the presentation of the formatted event related data to the recipient, the agent tracks the user behavior through the user link tracking (ULT), as illustrated in operation 720. ULT captures all the activities performed by the recipient including click activities at the event related data or in relation to the event related data. These activities reflect the recipient's behavior. The ULT information is stored in the Stats database by a Stats Collection and Feedback module 238, as illustrated in operation 730, and is used to train the agent of the recipient, as illustrated in operation 680. The training of the agent includes refining the logic within the agent to reflect the changes in the recipient's behavior. The refining of the logic relates to changing the computation of the weight of the various events related to the recipient based on the recipient's behavior. In one embodiment, the agent is developed using a functional language and the refining of the logic within the agent is by dynamically manipulating the logic in the functional language during run-time to reflect the changing interests of the recipient. The refined logic of the agent is stored in an agent's database, as illustrated in operation 690. The refined logic of the agent is used for subsequent mining and delivery of the event related data to the recipient.

The logic within the quality scoring subsystem (QSS) constantly mines the data that the recipients are providing by their behavior to prior event related data, dynamically prioritizes and rearranges the event related data and delivers the rearranged event related data as an update to the recipient authorized to receive such updates. It should be noted herein that the updates, as referred in this application, refer to social network updates that are delivered to a recipient usually in an email or other alert notifications as an offline update.

As mentioned earlier, in one embodiment, an agent is initially assigned to a specific group of recipients that are authorized to receive the event related data by assigning the agent to a globally user identifier (GUID) related to the group of recipients. Over time the logic of the agent starts evolving to adjust to the changing behavior of the group of recipients. In certain instances, user behavior of a highly engaged user may result in dynamically spawning a second agent from the agent and assigning the second agent to the highly engaged user.

The logic in the second agent is different from the logic of the agent assigned to the group of recipients. The second agent and the agent continue to evolve with the evolving behavior of the respective recipients. It can be seen from the aforementioned embodiments, the advantages of assigning an agent for every recipient and manipulating the logic within each of the agent to cater to the evolving needs/requirements of the recipient. The evolved agent provides the most up-to-date requirements of a particular recipient, making this a more robust and effective tool for providing offline updates to the recipients of a social network. Other advantages of the algorithm may be easily envisioned by one skilled in the art.

For the sake of simplicity, the embodiments of the invention have been explained with reference to receiving event related data upon triggering of a single event. It should be noted herein that the embodiments can be extended to cover a plurality of events triggering at any given time. Accordingly, the logic within the agent algorithm for each of the recipients is configured to accumulate a set of events from a plurality of event-generating users, analyze the event related data associated with the set of events and the recipients' profiles, format all the event related data for delivery to the appropriate recipients. The delivered event related data takes into account the preferred delivery channel requirements and preferences of each of the plurality of recipients.

It will be obvious, however, to one skilled in the art, that the present invention may be practiced without some or all of these specific details. In other instances, well known process operations have not been described in detail in order not to unnecessarily obscure the present invention.

Embodiments of the present invention may be practiced with various computer system configurations including handheld devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations can include the physical transformations of data, saving of data, and display of data. These operations are those requiring physical manipulation of physical quantities. Usually, though not necessarily, these quantities take the form of electrical or magnetic signals capable of being stored, transferred, combined, compared and otherwise manipulated. Data can also be stored in the network during capture and transmission over a network. The storage can be, for example, at network nodes and memory associated with a server, and other computing devices, including portable devices.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for delivering updates to recipients in a social network, comprising:
   a. receiving event related data in response to triggering of an event;
   b. retrieving recipient data related to the recipients authorized to receive the event related data, wherein the recipient data includes the event related data targeted for the recipients;
   c. assigning an agent for the recipients, the agent including logic for formatting and delivering the event related data to the recipients, wherein the agent is specific to a demographic group, wherein the recipients are members of the demographic group;
   d. tracking interaction of the recipients in response to delivery of the event related data;
   e. refining the logic of the agent based on the interaction of at least a specific recipient, the interaction identifying the specific recipient's behavior toward the delivered event related data, wherein the refining of the logic results in spawning a secondary agent, the secondary agent being specific for the specific recipient; and
   f. assigning the secondary agent with refined logic for delivering subsequent event related data to the specific recipient and using the agent to deliver subsequent event related data to rest of the recipients of the demographic group other than the specific recipient subsequent to assigning the secondary agent to the specific recipient, wherein the assigning includes using the refined logic of the secondary agent for selecting, formatting and delivering the event related data to the specific recipient, wherein the event related data delivered by the secondary agent is relevant to the specific recipient,
      wherein the event related data is delivered to corresponding recipients upon successful verification that a quality score computed for the event related data specified for the agent and the secondary agent matches a quality threshold.

2. The method of claim 1 wherein receiving further comprises:
   generating a feed identifier for the event related data; and
   storing event related data in a feed cache along with the feed identifier for subsequent retrieval by the agent or the secondary agent for delivery.

3. The method of claim 2, wherein formatting further comprises:
   retrieving the event related data from the feed cache;
   determining a preferred delivery channel for delivering event related data; and
   dynamically formatting the event related data to comply with requirements of the preferred delivery channel.

4. The method of claim 3, wherein the preferred delivery channel is determined based on any one or combination of recipient's profile and behavior toward the updates to the event related data, type of updates to the event related data, recipient's preference of device used in accessing the updates, and type of interaction of the recipient in response to delivery of a prior event related data.

5. The method of claim 1, wherein retrieving recipient data further comprises:
   identifying creator of the event related data; and
   extracting information associated with the recipient authorized to receive the event related data from a recipient list associated with the identified creator, wherein the information is used for distribution of event related data.

6. The method of claim 1, wherein delivering the event related data further comprises:
   computing the quality score for the event related data directed to the recipient based on one or more quality metrics associated with the recipient, the quality score determining relevance of the event related data for the recipient; and
   discarding the event related data for the recipient when the quality score for the event related data is below a quality threshold.

7. The method of claim 1 further comprises:
   identifying a template for delivering the event related data; and
   formatting the event related data using the template for delivery, the template defining layout and presentation of content of the event related data.

8. The method of claim 1, wherein delivering the event related data further comprises:
   determining a delivery threshold for the recipient; and
   automatically triggering delivery of the event related data when the delivery threshold for the recipient is met.

9. The method of claim 8, wherein the delivery threshold is specific to the recipient.

10. The method of claim 8, wherein delivering the event related data further comprises:
    incrementing a cumulative delivery score associated with the recipient when the delivery threshold for the recipient is not met; and
    storing the cumulative delivery score along with recipient information for the recipient in a database for subsequent delivery.

11. The method of claim 1, wherein the formatting includes prioritizing the event related data based on the interaction of the recipient in response to delivery of prior event related data.

12. The method of claim 1, wherein tracking interaction further comprises:
    weighting each event related data based on recipient's interaction in response to the delivery of the event related data, the recipient's interaction identifying relevance of the event related data to the recipient, the weighting used in subsequent delivery of the event related data to the recipient.

13. The method of claim 1, wherein the formatting further comprises:
    enriching content of the event related data with customization data, the customization data providing information related to one or more of creator, source, recipient or content of the event related data.

14. A method for delivering updates to recipients in a social network, comprising:
    receiving event related data in response to triggering of an event, the event related data stored in a feed cache;
    retrieving data associated with a plurality of recipients authorized to receive the event related data;
    assigning an agent for the plurality of recipients, the agent including logic for formatting and delivering the event related data to the plurality of recipients;

tracking interaction of a specific recipient from the plurality of recipients in response to delivery of the event related data, the specific recipient being a highly engaged recipient;

spawning a second agent from the agent in response to the tracking of interaction of the highly engaged recipient, wherein the logic in the second agent is refined and distinct from the logic in the agent based on the interaction of the highly engaged recipient;

assigning the second agent to the highly engaged recipient, wherein the second agent provides logic for selecting, formatting and delivering event related data targeted for the highly engaged recipient; and using the second agent for delivering subsequent event related data relevant to the highly engaged recipient and the agent for delivering subsequent event related data relevant to the plurality of recipients other than the highly engaged recipient subsequent to assigning the second agent to the highly engaged recipient, wherein the event related data is delivered to respective recipients upon successful verification that a quality score computed for the event related data specified for the agent and the secondary agent matches a quality threshold.

15. The method of claim 14 further includes, tracking interactions of the plurality of recipients including the highly engaged recipient in response to the delivery of the event related data; and refining the logic of the agent and the second agent based on the interactions of the plurality of recipients in response to delivery of the event related data, the refined logic of the agent and the second agent used in delivering subsequent event related data to the respective recipients.

16. The method of claim 14, wherein delivering the event related data further comprises:

determining a delivery threshold for each of the plurality of recipients, wherein the delivery threshold is specific to each of the plurality of recipients; and automatically triggering delivery of the event related data by the respective agent when the delivery threshold for each of the recipients is met.

17. The method of claim 14, wherein delivering the event related data further comprises:

retrieving a cumulative delivery score and a delivery threshold value for each of the plurality of recipients, wherein the cumulative delivery score and the delivery threshold value are distinct for each of the plurality of recipients;

incrementing the cumulative delivery score associated with corresponding ones of the plurality of recipients in response to the triggering of the event;

comparing the cumulative delivery score against the delivery threshold value for each of the plurality of recipients; and storing the cumulative delivery score along with recipient information for the corresponding ones of the recipients in a database for subsequent delivery when the delivery threshold value for the corresponding ones of the recipients is not met.

18. The method of claim 17, wherein when the delivery threshold value for the corresponding ones of the recipients is met, formatting further comprises:

retrieving the event related data from the feed cache for the corresponding recipients;

determining a preferred delivery channel for delivering event related data for each of the corresponding recipients; and dynamically formatting the event related data using a template to comply with requirements of the preferred delivery channel for each of the recipients for delivery by respective agents.

* * * * *